Aug. 11, 1959 H. L. BRADLEY ET AL 2,899,611
CAPACITOR
Filed Sept. 12, 1955

INVENTORS
Harry L. Bradley
Robert S. Howe
BY

David G. Fox
ATTORNEY

United States Patent Office 2,899,611
Patented Aug. 11, 1959

2,899,611

CAPACITOR

Harry L. Bradley, River Hills, and Robert S. Hower, Whitefish Bay, Wis., assignors to Allen-Bradley Company, Milwaukee, Wis., a corporation of Wisconsin Application September 12, 1955, Serial No. 533,753

7 Claims. (Cl. 317—242)

This invention relates to encased electrical units such as capacitors for electrical circuit networks and more specifically resides in an encased unit such as a capacitor having the dielectric and plates, forming the capacitor unit proper, disposed within a protective composite shell of hard material with a heat hardened bedding layer uniting the shell with the capacitor unit proper.

With increasing application of electronic equipment it has become desirable to provide electrical units such as ceramic disc capacitors with insulating jackets to permit contact with adjacent componets where space is confined. The insulation must retain adequate dielectric strength throughout a wide range of temperature and moisture conditions, and furthermore, must provide a strong physical cover that will withstand mechanical abuse and not deteriorate when subjected to elevated ambient temperatures.

Heretofore, electric units such as disc type ceramic capacitors have been dip coated with insulating resins to provide jackets of insulating material. Resins available for this purpose are not fully suited partly because of the low temperatures at which degradation of the material commences.

While the furnishing of stable, effective electrical insulation of the body of the capacitor is important, it is also of advantage to provide an assembled unit which is strong mechanically. In electric units such as ceramic disc capacitors in which the plates or electrodes are of fired in place silver, lead wires soldered to the plates offer means by which concentrated mechanical stress may be applied in a direction tending to separate the bond between the ceramic substance and the plates. By pulling on the leads transversely of the body the unit-area separating force is easily brought to a level where rupture is obtainable. This has heretofore been true even when lead wires otherwise smaller than would be desired are employed. The insulating coverings applied to ceramic capacitors, prior to this invention, have been of compositions having insufficient mechanical strength to offer any substantial reinforcement when the lead wires are pulled in this manner.

It is an object of this invention to encase the capacitor proper in an enclosure having a high modulus of elasticity and sufficient strength so that stress applied to the lead wires is resisted largely by the casing and is transmitted very little to the plates of the capacitor. In the present invention, a very hard protective shell is employed and bedding resin is utilized to join the protective shell to the dielectric disc.

It is another object of this invention to provide a capacitor that may be operated continuously at higher ambient temperatures than heretofore possible, without injury to the component.

It is another object of this invention to provide a capacitor with an insulating jacket surrounding the active electrical elements of the capacitor that has improved insulating qualities.

It is another object of this invention to provide a capacitor having a durable insulating jacket of ceramic material resistant to moisture.

These and other objects and advantages of this invention will appear in the description to follow. In the description reference is made to the accompanying drawing, which forms a part hereof, and in which there is shown by way of illustration and not of limitation a specific form in which this invention may be embodied.

Figure 1:
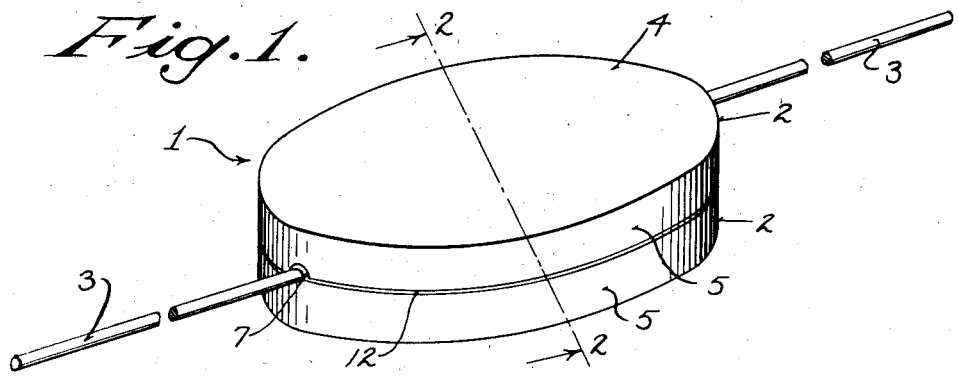
Fig. 1 is a view in perspective of a capacitor embodying the invention.
Figure 4:
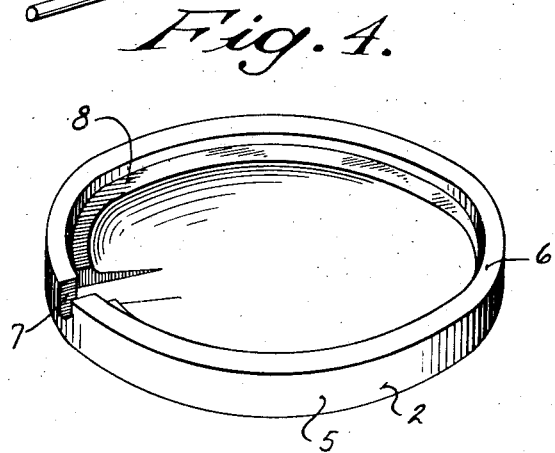
Fig. 4 is a view in perspective of a cup forming a part of the capacitor.

Referring now to the drawing, there is shown in Fig. 1 a completed capacitor 1. The exterior of the capacitor 1 comprises a pair of inwardly facing shallow insulating ceramic cups 2 and a pair of lead wires 3 extending outwardly from the cups 2. The exposed exterior of each cup 2 comprises a substantially flat circular end wall 4 from which extends a circular cylindrical side wall 5. The form of the interior of each ceramic cup 2 is clearly shown in Fig. 4. The surface 5 is formed as a part of a thin lip 6 that is notched at 7 to provide a passage for a lead wire 3 at a point adjacent the mating edges of the cups 2. A step fillet 8 is formed along the inner side of the lip 6, and the interior of the cup 2 is dished inwardly from the step fillet 8 to provide an appropriate cavity to receive the capacitor unit proper consisting of a dielectric disc 9 and a pair of intimately adhering plates 10.

The cups 2 may be formed of a suitable insulating ceramic, such as porcelain or steatite, or any other strong rigid insulating material having similar physical strength under compression which exhibits adequate resistance to heat and moisture.

The dielectric disc 9 may be a ceramic material composed of suitable titanates, such as the barium titanates prepared in accordance with well-known practices. Capacitors of this form have been designated ceramic type capacitors. The dielectric employed between the plates 10, however, may be of any suitable dielectric substance, organic or inorganic. The plates 10 may be formed of a coating of silver paste bonded to the flat surfaces of the disc 9, and together with the disc 9 form a capacitor unit proper 14. The lead wires 3 are soldered to the unit 14 by means of silver solder 11, and the unit 14 is then encapsulated within the pair of cups 2. To assemble the cups 2 and the capacitor proper a heat hardenable bedding material 12, including an epoxy resin, is utilized to fill the voids and to bond the assembly into a unitary whole. The cups 2 and material 12 thus form a composite shell of good insulation and heat resistant properties without dependence upon impregnating waxes or other sealing substances which are effected by comparatively low temperatures.

The epoxy resins are stable and exhibit and retain high dielectric strength under adverse moisture conditions. The epoxy resins further exhibit flow and wetting characteristics which render feasible simple and economical assembly of a finished capacitor.

The bedding material 12 may be prepared starting with an uncured polyepoxide composition or from such a composition slightly advanced, say to a molecular weight of 600 to 1,500. A filler such as silica flour is included. A commerically supplied composition, in solid meltable form, available under the trade name "Hysol" 6800, as furnished by Houghton Laboratories, is of this character. Such an uncured filled resin composition, taken as a liquid or melted to form a liquid is then held at a curing temperature after adding a hardening agent such as phthalic anhydride or other suitable substance capable of accelerating the curing step. The curing heat is continued for a period of twenty minutes to an hour or more determined by the point at which liquidity would become extinguished by any substantial continuance of heating. In this state the molecular weight of the polyepoxide will have increased greatly, probably to a value of from 5,000 to 15,000 more or less depending upon the particular composition employed. In this condition the melt is cooled so that it will solidify but may be remelted by rapid heating to a state of brief temporary liquidity.

Figure 5:
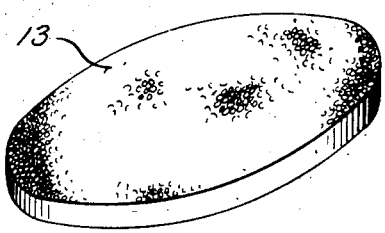
Fig. 5 is a view in perspective of a preformed wafer of heat hardening bedding resin utilized in forming the article of the invention.

After solidification the epoxy bedding material is granulated, and measured quantities of the granules compacted, in a suitable die, to provide preformed wafers 13, such as shown in Fig. 5. The final assembly of the cups 2 and the capacitor proper, formed to the dielectric disc 9 and the plates 10, may now be made with the use of a pair of the preformed wafers 13. A wafer 13 is disposed, in the interior of each cup 2, between the respective cup 2 and the capacitor proper. Heat is applied and each wafer 13 is brought to a temperature at which melting and flow is again obtained. The resin quantity is measured to fill the space between each cup 2 and the capacitor proper, without appreciable overflow or loss of the bedding material 12. For this final assembly the cups 2 may be attached one at a time to the capacitor proper, or the entire assembly may be stacked and both wafers 13 remelted and heat hardened simultaneously.

It is an important aspect of the discovery of this invention that by partially curing an epoxy resin combined with a suitable hardening catalyst that a measured quantity of a prepared bedding agent may be formed as a solid preform which greatly facilitates final assembly.

Figure 2:
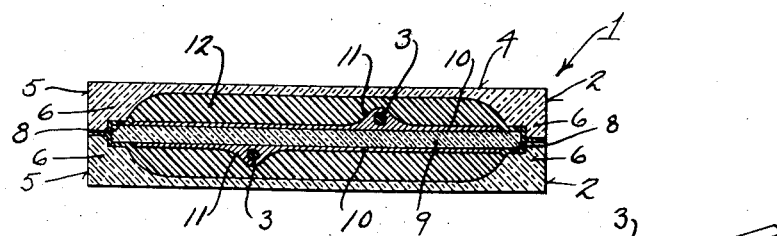
Fig. 2 is a view in section of the capacitor taken on the plane 2—2 indicated in Fig. 1, Fig. 3 in a view in perspective of a subassembly of the capacitor before final assembly is made.
Figure 3:
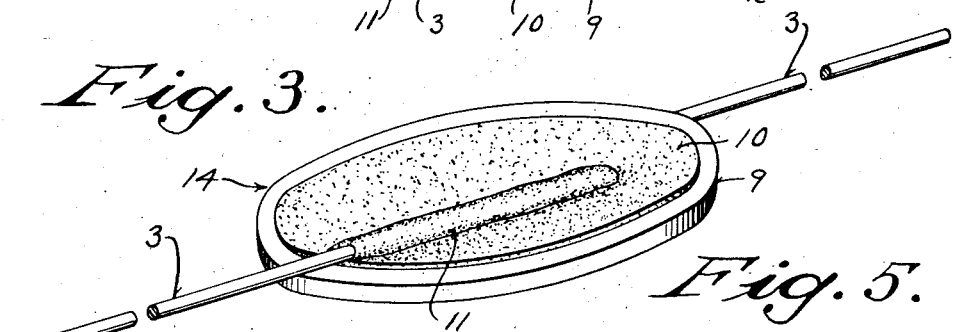

As is shown in Fig. 2, during final assembly of the capacitor 1 the margin areas of the dielectric disc 9 are seated on the step fillets 8 of the cups 2. In this fashion the parts are located so that a uniform product will result, with a predetermined cavity at each side of the dielectric disc 9 for the epoxy bedding material.

The preliminary curing of the epoxy bedding material 12, before preforming into the wafers 13, is such that the resin is brought to a stage close to final curing where subsequent heating will liquefy the same but the flow is greatly restricted. In this way the viscosity resulting upon reheating is high and the material 12 will retain position within the cups 2 without voids and without overflow and a short subsequent heating will complete the cure so that the resin will be no longer thermoplastic. The final liquefaction, although brief in duration, is, nevertheless, effective in producing a wetting of both the electrical unit which is enclosed and the interior surfaces of the cups 2. High adhesion, characteristic of epoxy resins, is, therefore, ensured between the bedding composition and the adjacent parts. In this manner a solid composite article encased in a shell, exhibiting desired mechanical strength, is achieved.

In accordance with this invention, a hard, strong external shell or casing is thus caused to adhere tightly to the capacitor unit proper by a strong intermediate bedding substance. The shell is composed of porcelain or the like which, although somewhat brittle, has considerable strength and a high modulus of elasticity. Such a shell, properly joined to the remaining parts, surrounds and retains the lead wires with such strength that they may not be pulled so as to apply a force likely to separate the plates from the capacitor dielectric. This restraint of the lead wires is such that rupture of the lead wire will occur under transversely applied stress before separation of the electrode plate from the capacitor dielectric. For example, where the lead wires of capacitors without the jackets of this invention employing lead wires of No. 22 B & S gauge are subjected to transverse loading, rupture of the plate bond will occur when a pull of 3 to 5 pounds is applied. Units with 22 gauge leads jacketed in accordance with this invention do not fail until a pull of 15 to 20 pounds is similarly applied. This is equivalent to the rupture strength of hard drawn copper of 22 gauge when bent at right angles. By reason of the increased strength noted in this manner, capacitor units, made in accordance with this invention, having lead wires of 20 gauge have been found acceptable and withstand a transverse pull applied to the lead wires of 20 to 25 pounds. This loading again is approximately equal to the rupture strength of hard drawn copper of 20 gauge when bent at right angles. The improvement in strength, thus demonstrated, amounts to about 700% more or less and further increase may be possible with lead wires of still larger diameter. Dip coating compositions heretofore in use have been incapable of contributing but a small fraction of the strength of lead wire attachment which is contributed by the structure of this invention.

The increased strength of lead wire attachment depends upon the use of a very hard and unyielding insulating shell with a hard bedding material such as cured epoxy resin which substantially fills the voids between the encased unit and the shell and grips the adjacent surfaces with the very strong, adherent bond characteristic of the epoxy resins. The result is surprising, since the strength of attachment of the lead wire easily exceeds its rupturing strength in wire sizes normally employed.

The cups 2 not only provide a suitable protective cover for the finished capacitor 1, but also provide a rigid structural frame that withstands a substantial part of such forces as may be exerted by reason of shrinkage of the epoxy material 12 during the final cure. The epoxy material 12 has strong adhesive qualities, as noted, and as curing takes place the shrinkage of the material 12 may impose stresses of considerable magnitude upon the disc 9. The frame, provided by the cups 2, withstands a large part of such stress, relieving the dielectric disc 9.

We claim:

1. In an insulated capacitor the combination comprising a capacitor unit consisting of a dielectric body and electrode plates on opposite sides thereof, and lead wires connected to said plates and extending outwardly of said capacitor unit, a ceramic jacket surrounding the unit and a portion of each of said lead wires, which jacket is comprised of a pair of like inwardly facing dished cups to form a cavity to receive the unit, and bedding material comprised substantially of epoxy resin in adherent contact with the unit and with said lead wire portions and with the ceramic jacket filling the space therebetween.

2. In an insulated capacitor like that of claim 1 in which the dielectric body is a flat disc and each cup has a peripheral lip including an inwardly recessed step that mates the periphery of the disc for receiving the disc and locating the disc with respect to the cup.

3. A capacitor comprising a disc of dielectric material having a metal coating on each side thereof, enclosed between two mating shallow cups of ceramic material, a lead wire connected to each said metal coating and emerging in a slot at the juncture of edge surfaces of said cups, with a hardened resinous material comprised substantially of epoxy resin in such voids as may occur between said disc and cups.

4. In an encasement for an electrical unit having terminal lead wires extending outwardly therefrom, the combination with said unit comprising a thermo-setting bedding compound comprised substantially of epoxy resin surrounding and adhering to said unit and to inner portions of said lead wires, and a ceramic shell formed of a plurality of shell elements with meeting edges substantially surrounding said bedding compound and adherently attached thereto, said thermo-setting compound having been cured while in contact with said unit and said shell.

5. An encasement for an electric unit constructed in accordance with claim 4 wherein the thermo-setting bedding compound consists of filler and a bonding agent a major proportion of which is epoxy resin.

6. An encasement for an electric unit constructed in accordance with claim 4 wherein exit openings are provided for the lead wires adjacent the meeting edges of said shell members.

7. An encasement for an electric unit in accordance with claim 4 wherein the outer shell members are composed of porcelain.

References Cited in the file of this patent

UNITED STATES PATENTS

| | | |
|---|---|---|
| 2,385,460 | Omansky | Sept. 25, 1945 |
| 2,414,525 | Hill | Jan. 21, 1947 |
| 2,580,612 | Schwarz | Jan. 1, 1952 |
| 2,674,646 | Schoch | Apr. 6, 1954 |
| 2,706,798 | Kodama | Apr. 19, 1955 |

FOREIGN PATENTS

| | | |
|---|---|---|
| 504,926 | Great Britain | Apr. 27, 1939 |
| 518,127 | Great Britain | Feb. 19, 1940 |